Nov. 10, 1970        SHU-TUNG TU        3,539,389
PROCESSES OF MAKING MICROPOROUS POLYMER SHEETS
Filed May 19, 1967
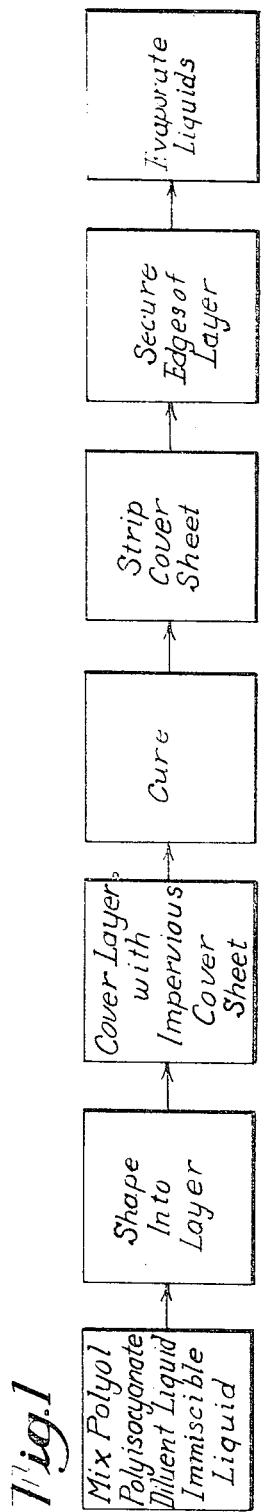
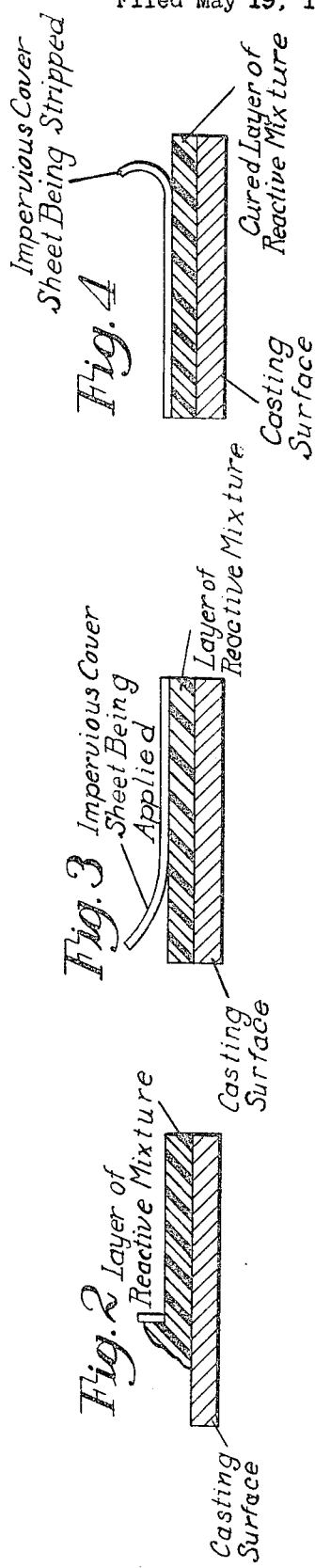
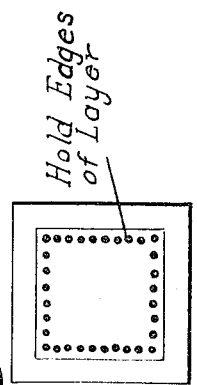
Inventor
Shu-Tung Tu
By his Attorney
Benjamin C. Pollard

United States Patent Office 3,539,389
Patented Nov. 10, 1970

3,539,389
PROCESSES OF MAKING MICROPOROUS
POLYMER SHEETS
Shu-Tung Tu, St. Albans, W. Va., assignor to USM Corporation, Flemington, N.J., a corporation of New Jersey
Filed May 19, 1967, Ser. No. 639,642
Int. Cl. B29d 27/04; B44d 1/09; C09d 3/72
U.S. Cl. 117—161                                3 Claims

ABSTRACT OF THE DISCLOSURE

A thin, microporous sheet having markedly increased permeability to water vapor and gases is formed by depositing a thin layer of a liquid emulsion of which the continuous phase includes a liquid polymeric material reactive to form a flexible, resilient solid together with a volatile diluent liquid miscible with the polymeric material, and the discontinuous phase is fine droplets of a volatile liquid immiscible and nonreactive with the continuous phase. The polymeric material is converted through reaction to a solid state with the droplets of immiscible liquid held in the solidified material. The solid sheet obtained is physically held against area change; and the miscible and immiscible liquids are removed leaving uniform thin microporous sheet having high gas and water vapor permeability.

FIELD OF USE, BACKGROUND AND PRIOR ART RELATIVE TO THE INVENTION

This invention relates to improved processes for forming a microporous sheet or coating.

The ability to transmit substantial amounts of water vapor is an important requisite of materials for the manufacture of shoes, garments and upholstery. Leather substitute materials heretofore known for such uses have generally comprised a resinous layer with pores or cells developed in it by chemical or mechanical means to provide porosity which would permit escape or transmission of moisture through such materials.

A porous sheet, or a supported porous layer in which there are provided pores or spaces of controlled size has been formed by depositing and solidifying a layer of an emulsion including fine droplets of immiscible liquid dispersed in a continuous liquid phase comprising reactive, preferably polymeric material and a volatile solvent. The polymeric material is converted through reaction to a tough, solidified, resilient condition with the dispersed liquid droplets held in the solidified material. The liquid of the droplets is then removed without expanding the solidified body leaving spaces constituting openings or pores in the solidified material. Portions adjacent a surface of bodies so formed have been nonporous and where breathability and water vapor permeability are important, the nonporous surface has been removed generally by abrasion.

In a later development forming the subject of a U.S. patent application in the name of the present inventor, filed Apr. 17, 1967, Ser. No. 631,171, and entitled, "Processes of Making Microporous Polymer Sheets," it was found that the porosity is preserved in the surface portions by disposing a protective cover on the surface of emulsion layer while the emulsion is liquid and leaving it in place during solidification of the continuous phase. The protective cover is removed after the emulsion has solidified to allow removal of the miscible and immiscible liquids. The product, including surface portions is uniform in porosity. However, in many instances it is desirable to provide even higher breathability and water vapor permeability than is obtained through practice of that process.

SUMMARY OF THE INVENTION

I have found that a thin microporous sheet with good toughness, flexibility and other desired properties but with markedly higher permeability may be formed by holding the solid sheet against area change during removal of the immiscible and miscible liquids. A sheet from which these liquids are removed while the sheet is held against area change may have a water vapor permeability substantially greater than the water vapor permeability of a similar sheet which is unrestrained during the course of liquid removal. It appears that physical restraint of the solidified body helps resist collapse or closure of the open cells within the solid sheet which would tend to occur in the physical rearrangement induced by removal of the liquids.

DESCRIPTION OF THE PREFERRED EMBODIMENTS

Reference is made to the attached drawings in which:
FIG. I is a flow sheet of the present process;
FIG. II is a diagrammatic edge view of the formation of a liquid layer of the reactive mixture which will be solidified to form a microporous layer;
FIG. III is a diagrammatic edge view of the step of laying down an impervious cover sheet on the liquid layer;
FIG. IV is a diagrammatic edge view of the step of removing the impervious cover sheet from the solidified layer formed by reaction of the mixture which had been laid down as a liquid; and
FIG. V is a diagrammatic top view showing edge portions of the solidified layer with its edges secured to restrain it against area change during removal of liquids.

A variety of reactive materials may be used in the process. The reactive materials and nonsolvent liquid are selected for cooperation with each other so that reaction to solid condition occurs at temperatures at which the dispersed droplets can be kept in liquid condition. That is, where higher boiling point nonsolvent liquids are used in the dispersed phase, it is possible to use reactive materials which require higher temperatures for reaction than would be possible with lower boiling point nonsolvent liquids. Additionally the reactive materials are selected on the basis of their known properties of providing toughness, flexibility, hardness and other physical properties required in the final product.

The preferred reactive materials are those for forming tough, flexible high strength polyurethane or polyurea reaction products. The reactive material may be a "one shot" mixture of an organic compound having at least two active hydrogens such as a polymeric polyol, e.g., polyalkylene ether polyol and/or polyester polyol, with a reactive compound having at least two reactive —NCO groups, e.g., a polyisocyanate. Alternatively, the reactive material may be a prepolymer system in which an —NCO terminated reaction product of polyol with excess polyisocyanate, is combined with chain extenders which may be polyhydroxy or polyamine compounds. The reactive material must be either a liquid or reducible to a liquid by heat or addition of a solvent.

Polyols useful in the "one shot" mixture or for forming the reactive prepolymer include substantially linear or only moderately branched polyether polyols, and substantially linear or moderately branched polyester polyols from the condensation of polybasic acids, e.g., adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or —COOH groups may be included in the compositions reactive to form polyester polyols to introduce moderate branching or cross linking.

Prepolymers are made by well understood procedures involving reaction of the polyether polyols or the polyester polyols with organic polyisocyanates including the toluene diisocyanates, methylene diisocyanates and the like. A proportion of polyisocyanate material having more than two reactive isocyanate groups may be included to provide a desired extent of cross linking.

The action of the nonsolvent pore-forming liquid is primarily physical, that is, the nonsolvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial nonsolvency and nonreactivity with the polymeric material together with suitable volatility characteristics may be used. Complete insolubility is not necessary provided an amount is used in excess of the solubility in the continuous phase. Normally, liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition; but other substantially inert organic liquids such as liquid alkyl ethers, e.g., amyl ether may be used. It is also possible to use water as the dispersed liquid particularly with active chain extenders although this introduces the factor of reaction of a portion of the water with isocyanate groups and requires the use of additional water to compensate for that which may react. To avoid premature evaporation from the coating so that it can serve its space filling function until the coating has solidified, the pore-forming liquid is chosen to have a boiling point above the selected reaction temperature and should preferably have a boiling point of at least about 100° C. and preferably at least 130° C. to allow use of temperatures giving a desirable rate of reaction of the polymeric material. On the other hand the liquid will be chosen with low enough boiling point for removal without heat injury to the coating or the base on which it may be disposed. Thus the liquid should ordinarily not contain substantial quantities of high boiling or low volatility components, and preferably over 90% of components should boil at a temperature of not over 450° F. It is to be understood that other means than evaporation, e.g., extraction, may be used to remove high boiling or low volatility liquid and in such cases the upper temperature limit, i.e., the boiling point, does not apply.

Dispersion of droplets of the pore-forming liquid in the liquid body of reactive polymeric material to form an emulsion in which the reactive polymeric material is the continuous phase, is effected by vigorous agitation during the course of addition of the pore-forming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and non-ionic surface active agents such as commercially available silicone emulsifiers, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.001 to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate.

In the two steps process, an —NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with prepolymer material forming the continuous phase. Chain extenders effective to increase the molecular weight of the prepolymer are compounds having two or more active hydrogen atoms such as p,p′-methylene-dianiline, 4,4′-methylene-bis-(2,-chloroaniline), trimethylolpropane, m-phenylediamine, 1,4 butane diol and triethanolamine.

In these reactions a quantity of true solvent is added to the polymeric material, either the polymeric polyol or the —NCO terminated prepolymer. The quantity of true solvent to be used will vary depending on the nature of the reaction components. Thus solid or high viscosity liquid reactive components will call for higher proportions of true solvent. Ordinarily amounts used will be from 25% to about 150% based on the reactive material but somewhat higher or lower amounts may be used. Useful solvents include organic liquids substantially non-reactive with the polymeric material or other components of the composition and substantially immiscible with the pore-forming liquid. Volatile organic liquids such as methyl ethyl ketone and benzene are ordinarily used. The solvent reduces the viscosity of the polymeric material to facilitate the formation of an emulsion and also may be used to reduce the reaction rates between the polymer and the material reacted with the polymer to increase its molecular weight. The solvent slows down the reaction by dilution of the reagents and permits the mixture to remain fluid during the time required for batch processing.

The emulsion is shaped into a layer (see FIG. II) promptly after formation and before the reaction has proceeded to a point where gelling of the composition through increase in molecular weight has occurred. The layer may be formed by coating the emulsion on surfaces by any of a variety of means including spraying, brushing, dipping, knife spreading and so on. Coating thicknesses may range from very thin but continuous deposits, e.g., 8 mils wet thickness up to as high as 100 mils wet thickness.

Surfaces on which the layer may be formed include casting surfaces such as glass or a release sheet, e.g., silicone or other treated paper from which the resultant film may be stripped after solidification, and porous bases such as woven or nonwoven fibrous sheet material, paper, felt and so on, on which the deposited material will form a permanent coating.

For providing a porous film integrally united to a supporting layer the emulsion may be spread directly on the supporting surface where the viscosity of the emulsion and the openness of the surface to which applied are such that penetration does not occur to an excessive degree. Thixotropic additives such as silica aerogel are useful in giving viscosity characteristics resisting excessive penetration.

Where porosity extending to the exposed surfaces of the product is desired, a substantially impervious protective cover is disposed on the upper surface of the deposited emulsion layer as the layer is formed, or promptly after it is formed (see FIG. III). The cover may be a release sheet such as a paper sheet carrying a nonadhesive deposit for example, of silicone, polytetrafluoroethylene, polychlorotrifluoroethylene, wax, polyethylene or polypropylene, or may be a nonadhesive supported or unsupported resin or elastomer sheet. The protective cover, which is preferably flexible for convenience in handling, may be laid down on the emulsion layer by hand or by any of the known devices for laying a sheet down smoothly on a surface.

With the cover in place, the reaction of the polymeric progresses to gel and solidify the emulsion to a state in which the droplets of nonsolvent liquid are held in a solid matrix. The protective cover is removed from the layer when the layer has become a stable solid (see FIG. IV).

When the layer has become solid and the protective cover if any has been removed, the solidified layer is stripped from the surface on which it is formed and is clamped or otherwise held to restrain it physically against area change which would otherwise occur in the course of removing the solvent and nonsolvent liquids. For example, the layer may be disposed on a permeable or impermeable supporting surface and its edge portions secured to the surface by fasteners, such as staples, (see FIG. V) or the layer may be clamped in a frame. For continuous operations, the opposite longitudinal edges of a continuous sheet may be held in clamps mounted for movement on tracks spaced to hold the sheet against shrinkage. The area change of an unrestrained sheet or layer is ordinarily a shrinkage which may amount to a substantial portion of the total area for example as much as 20% or 30% and is believed to be the result of deswelling of the solidified plastic primarily through removal of the solvent liquid.

Holding the solidified layer against area change, i.e., shrinkage during removal of the liquids gives the surprising result that the water vapor permeability of a layer so restrained may be as much as two or more times the permeability of an identical sheet not so restrained. This increase in permeability is much greater than might be expected. That is in a 20% loss of area one might expect slightly more than a 20% loss in permeability. The action then is something more than prevention of expected shrinkage in size of pores. The exact reason for this improvement is not free from doubt. It is possible that the tension on the structure resulting from the shrinkage of the solidified material may alter the physical or molecular structure, and it is even possible that the tension controls the character of elimination of solvent and nonsolvent liquids to give a more effective shape to the pores. Patentability is not based upon the correctness of these explanations which are only advanced for assistance in understanding the invention since an unexpectedly great improvement is obtained through the practice of the method.

The following example is given to aid in understanding the invention but it is to be understood that the invention should not be restricted to the materials, proportions or procedure of the example.

EXAMPLE 80 grams of a glycol-adipate polyesterurethane prepolymer having a molecular weight of about 1400 and containing approximately 6.2% reactive —NCO was mixed with 66 cc. of methyl ethyl ketone and 22 cc. of acetone, and 4.4 grams of polyoxyalkylene derivative of sorbitan monooleate was added as emulsifier. 160 cc. of a liquid paraffinic hydrocarbon mixture having a boiling point range of 366° F. to 405° F. was added to the solution and emulsified by vigorous agitation. Fine droplets of the liquid hydrocarbon constituted the internal phase.

23 cc. of a 48% solution of methylene dianiline in methyl ethyl ketone was added to the emulsion and thoroughly mixed in. The emulsion was centrifuged to remove entrapped air bubbles and then cast as a film on a glass surface which had been treated with a release agent. One half of the film was covered immediately with a silicone treated release paper which was deposited on the layer without disruption of the layer. The other half of the film was left uncovered. At the end of 30 minutes the emulsion had set up to a firm gel and the cover sheet was removed. The gelled sheet was stripped from the casting surface. Samples were cut from portions of the sheet which had been covered with release paper and from portions of the sheet which had not been covered with the release paper and the edges of these samples were firmly fixed to the supporting surface. The samples of the sheet which had been secured to the supporting surface and the remainder of the sheet which had not been fixed to the supporting surface were then subjected to air drying at room temperature for 30 minutes and thereafter cured by heating for one hour at 85° C. and one hour at 170° C.

In each case, the sheet material after curing was tough and flexible. It was noted that the portions of the sheet which had been covered with the release paper were notably whiter than the portions which had not been covered.

It was also noted that the portions of the sheet of which the edges had not been secured to the supporting surface had shrunk in area. The water vapor transmission rate was determined by standard procedure for the portion (A) that had been covered and dried and cured with its edges fixed to a supporting surface, the portion (B) that had been covered and which had been dried and cured with its edges not fixed to the supporting surface, the portion (C) that had not been covered and that had been dried and cured with its edges fixed on a supporting surface and (D) the portion which had not been covered and which had been dried and cured with its edges not fixed to a supporting surface. The average water vapor permeabilities for 4 samples cut from each of the portions A, B, C and D of the sheet were as follows:

A—3.01 grams/3 cm.$^2$/24 hrs./22 mils.
B—2.35 grams/3 cm.$^2$/24 hrs./22 mils.
C—1.02 grams/3 cm.$^2$/24 hrs./22 mils.
D—0.8 gram/3 cm.$^2$/24 hrs./22 mils.

Having thus described my invention what I claim as new and desire to secure by Letters Patent of the United States is:

1. In a process for forming a microporous, water vapor permeable layer including the steps of providing a liquid emulsion of which the continuous phase comprises a liquid mixture reactive to form a tough, flexible, high strength elastomeric material, said reactive mixture comprising a mixture of an organic compound providing at least two reactive —NCO groups per molecule and an organic compound having at least two active hydrogens per molecule for reaction with said —NCO groups to form a resilient polyurethane and from about 25% to about 150% by weight based on the weight of said reactive mixture of a volatile organic liquid diluent nonreactive with the compounds of said reactive mixture miscible with or soluble in at least one of said compounds, and the disperse phase of said emulsion comprising fine droplets of a volatile organic liquid substantially nonreactive with said organic compounds and substantially immiscible with said continuous phase, said liquid having a boiling point of at least about 100° C. and at least about 90% boiling below 232° C., said volatile organic liquid being present in amount of from 25% to about 300% by weight based on the weight of the reactive material, forming said emulsion into a layer on a supporting surface, reacting said mixture at a temperature below the boiling points of said volatile diluent liquid and said immiscible liquid to convert said layer to a solid entrapping the droplets and removing said diluent liquid and said immiscible liquids, the improvement which comprises the steps of restraining said sheet against area change during removal of the immiscible and miscible liquids.

2. The process for forming a microporous water vaopr permeable layer as defined in claim 1 including the steps of providing a substantially impervious cover on the exposed face of said layer of the liquid emulsion before substantial reaction of said organic compounds, thereafter reacting said compounds to bring the layer to solid state with said cover in place and without substantial expansion of said layer, and stripping said sheet from said face after solidification of said reaction mixture prior to removing the diluent liquid and immiscible liquid from said layer.

3. The process for forming a microporous, water permeable layer as defined in claim 2 in which the cover is removed from the layer and the layer is removed from the surface on which it is formed after the reactive mixture has gelled to shape-retaining condition but before complete cure of the reactive mixture, the diluent liquid and immiscible liquid are removed from the incompletely cured layer and the layer is subjected to higher temperatures after removal of said liquid to complete the cure.

References Cited
UNITED STATES PATENTS

| | | |
|---|---|---|
| 2,956,310 | 10/1960 | Roop et al. _____ 264—216 |
| 3,100,721 | 8/1963 | Holden. |
| 3,108,009 | 10/1963 | Clancy et al. |
| 3,264,134 | 8/1966 | Vill et al. |
| 3,342,759 | 9/1967 | Short et al. _____ 260—2.5 |
| 3,413,184 | 11/1968 | Findlay et al. ____ 264—216 XR |

PHILIP E. ANDERSON, Primary Examiner

U.S. Cl. X.R.

161—159, 406; 264—41, 53, 331